United States Patent [19]

Legare

[11] Patent Number: 4,871,694

[45] Date of Patent: Oct. 3, 1989

[54] CELLULAR CERAMIC MATERIAL AND METHOD OF PRODUCTION THEREOF

[76] Inventor: David J. Legare, 11 Bonnie Ave., New Hartford, N.Y. 13413

[21] Appl. No.: 97,707

[22] Filed: Sep. 17, 1987

Related U.S. Application Data

[63] Continuation-in-part of Ser. No. 840,071, Mar. 17, 1986, abandoned.

[51] Int. Cl.$^4$ .............................................. C03C 11/00
[52] U.S. Cl. ........................................ 501/39; 501/12; 501/56; 501/57; 501/85; 106/75; 252/315.5; 252/606
[58] Field of Search .................. 501/85, 12, 39, 56, 501/57; 106/75, 74; 252/606, 315.5

[56] References Cited

U.S. PATENT DOCUMENTS

| | | | |
|---|---|---|---|
| 2,806,801 | 9/1957 | Leston | 106/74 |
| 4,056,937 | 11/1977 | Suzaki | 61/36 B |
| 4,118,325 | 10/1978 | Becker et al. | 252/8.1 |
| 4,378,249 | 3/1983 | Beale et al. | 106/74 |
| 4,466,831 | 8/1984 | Murphey | 106/74 |

FOREIGN PATENT DOCUMENTS

| | | | |
|---|---|---|---|
| 2053841 | 4/1971 | France | |
| 45-15056 | 5/1970 | Japan | 252/315.5 |
| 49-94716 | 9/1974 | Japan | 106/74 |
| 53-104626 | 9/1978 | Japan | 106/75 |
| 833664 | 6/1981 | U.S.S.R. | 106/74 |
| 1227482 | 4/1971 | United Kingdom | 501/85 |

Primary Examiner—William R. Dixon, Jr.
Assistant Examiner—Karl Group
Attorney, Agent, or Firm—Charles S. McGuire

[57] ABSTRACT

A material having superior that insulating qualities which may be formed in flat sheets or any other desired configuration. The material in its basic form is produced by mixing an alkali metal halide or nitrate into an alkali metal silicate solution to form a polymerized silicate gel. The gel may be heated to cause intumescence and the formation of a dry cellular ceramic, or may be used in gel form, e.g., as a fireproof barrier which will expand upon exposure to heat. Physical properties of the end product are altered by the inclusion of one or more additives prior to the polymerization reaction. These additives may be any of a number of materials that do not significantly react with the alkali metal silicate solution or otherwise inhibit the formation of the gel.

10 Claims, 4 Drawing Sheets

MOLAR RATIO BETWEEN ADDITIVE SUBSTANCES
AND ALKALI METAL SILICATE

\* ADDITIVE SUBSTANCES CONSISTED OF ALUMINUM SILICATE (25%), CALCIUM CARBONATE (21%), AND SILICA GEL (54%)

CELLULAR CERAMIC MATERIAL AND METHOD OF PRODUCTION THEREOF

BACKGROUND OF THE INVENTION

The present invention relates to ceramic materials and methods of production thereof, and more specifically, to ceramic (i.e., inorganic, silicate-based) materials of potentially low density and good thermal insulating qualities.

A number of alkali metal silicate-based insulation materials have been described in the prior art. Characteristic examples of such materials are evident from U.S. Pat. Nos. 4,297,252 (Caesar et al); 4,521,333 (Graham et al); 4,118,325 (Becker et al); and Great Britain Pat. No. 1,227,482. These patents describe well-known methods of hardening an aqueous alkali metal silicate composition to form a gel or solid product. The basic hardening techniques include chemical methods such as adding sodium or potassium fluorosilicate and/or organic gelling agents such as haloalcohols, amines, ketones, etc., or by heating the gel at low temperature (approx. 100° C.) to reduce water content.

Though apparently well-suited to a number of applications, these techniques have a number of serious draw-backs. First of all, methods which involve heating to form the gel are expensive in terms of time and energy consumption. Furhermore, this gel can not be easily molded or extruded. Intumesced ceramics produced from these gels have very little structural strength because of their extremely low density, unless large amounts of filler materials have been incorporated into the starting silicate solution. Gels produced using organic hardening agents are easier to machine because of their plastic-like consistency. However, gels containing organic materials such as haloalcohols and amines present fire and toxicity hazards when heated to produce solidification or intumescence.

Fluorosilicates are usually used in combination with organic hardening agents. When used alone, in sufficient quantity to cause solidification of the silicate solution, the resulting material does not exhibit intumescence (expansion and cell formation) when subjected to temperatures which normally cause this reaction to occur (around 1000° F.) in gels produced by other means. Furthermore, when heated to high temperatures, the fluorosilicate may decompose to produce extremely toxic gasses such as silicon tetrafluoride and fluorine.

It is a principle object of this invention to provide a simple, inexpensive technique for producing alkali metal silicate gels which offer a number of benefits over prior methods.

A further object is to provide a method of producing alkali metal silicate gels which are non-toxic and can be easily molded and machined.

Another object is to provide a method of producing silicate gels which can be heated (to cause intumescence) to produce a variety of low and high density insulation materials.

Other objects will in part be obvious and will in part appear hereinafter.

SUMMARY OF THE INVENTION

In accordance with the foregoing objects, the invention contemplates a process for the formation of a silicate gel material which, in its basic form, is produced by the combination of one or more simple alkali metal halids or nitrates (of the form $M_1 X_1$ where M is the alkali metal, and X is the halide or nitrate; e.g. NaCl) with a solution of sodium or potassium silicate. Preferably, certain additives such as silicates, carbonates, oxides, and other materials which do not cause precipitation of the soluble silicate are mixed into the solution prior to mixing in the alkali metal halide or nitrate in order to vary the properties of the final product. Also, fibers or other filler substances may be added either prior to, simultaneously with, or after the mixing in of the alkali metal halide or nitrate. The solution may thereby assume the consistency of a slurry or paste, depending upon the quantity of the material added.

After formation of the gel, the material may be molded to essentially any desired form and allowed to harden completely at room temperature. The material may also be applied to a substrate with a sprayer before the gelling (polymerization) reaction is completed. Since this reaction may occur very quickly, (within a few seconds) for some mixtures, it may be necessary to mix in the alkali metal halide or nitrate as the material is being sprayed, e.g., within the sprayer nozzle.

The material may be left in the gel state to serve as a fireproof layer in packaging and construction materials. As such, the gel would react to heat and flame by expanding through intumescence to form a highly insulative and reflective barrier. The dehydration of the gel during this process also serves to carry away damaging heat.

The gel may also be heated, preferably at around 1000° F., to cause intumescence and the consequent formation of a cellular ceramic/glass foam. The surface of this foam may be quickly heated to its melting point to create a glazed surface.

DETAILED DESCRIPTION

The present invention is directed to a process for the formation of easily manufacturable and machineable silicate gels which can be made to exhibit a wide range of properties to suit a number of different applications.

The process primarily involves the combination of alkali metal silicates in aqueous solution with alkali metal halide and/or nitrate salts to produce a pliable, plastic-like gel. The use of these alkali metal halide and nitrate salts allows the production of materials which are not possible by any other known method, particularly with fluorosilicates commonly used in the prior art. For example, using equivalent quantities of potassium or sodium fluorosilicate (silicofluoride) in place of the alkali metal nitrate or halide in any of the compositions described by this invention results in a gel which will not intumesce to any noticeable degree. The heated gel merely hardens into a stone-like composition. By contrast, with the methods of the present invention, tough ceramic foams can be produced which are several times the volume of the starting gel. Furthermore, denser ceramics can be produced by the inclusion of additive substances as described in the following paragraphs.

Figure 1:
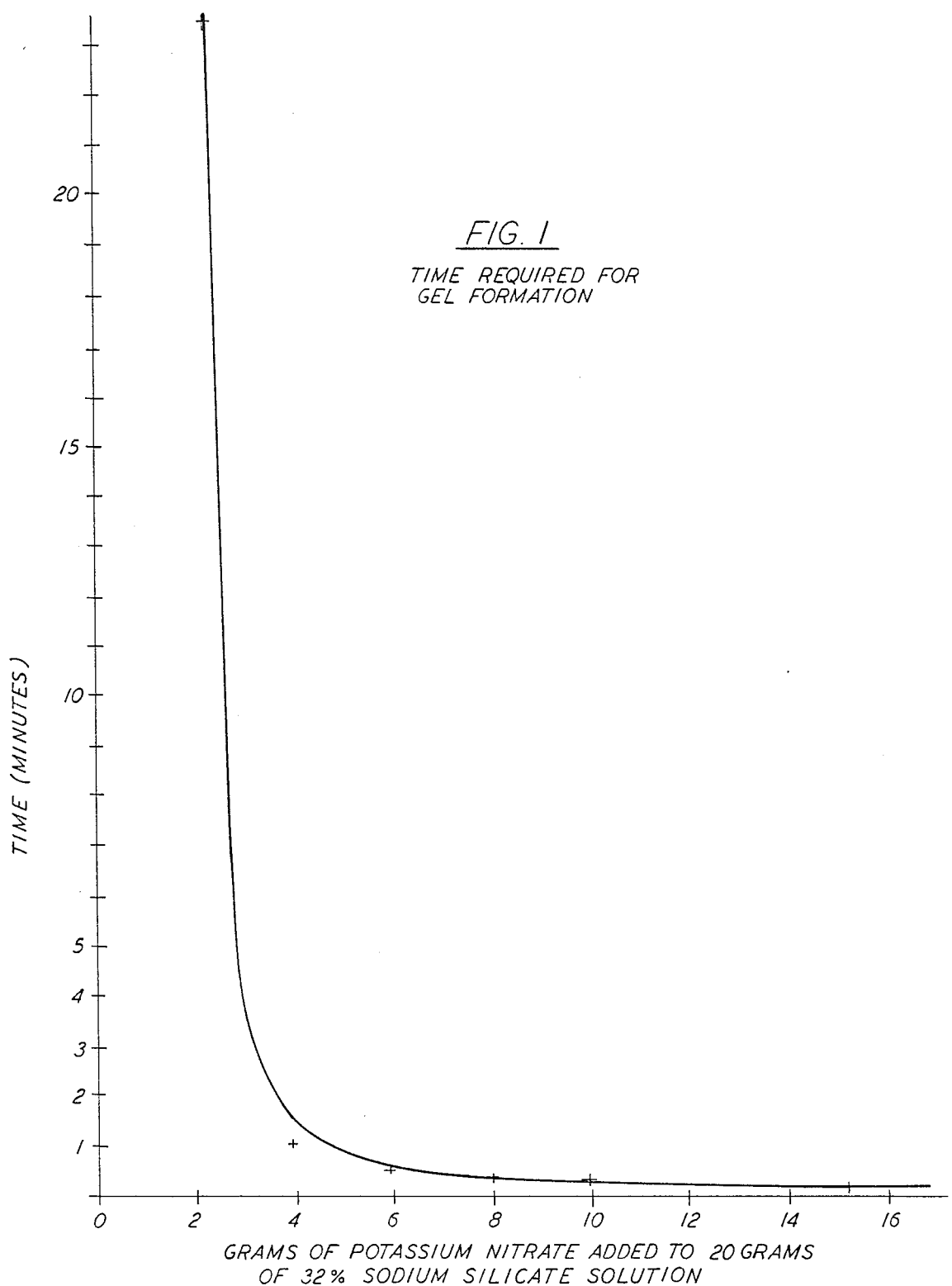
FIG. 1 is a graphical representation of the relationship between the time required for gel formation and the amount of a particular gelling salt which is added to an alkali metal silicate solution.

The alkali metal silicate used in this invention should be sodium or potassium silicate with a silicon to metal oxide ratio e.g.,($SiO_2$:$Na_2O$) betweeen 1:1 and 5:1 (preferably, between 2:1 and 4:1). The solution may also contain colloidal $SiO_2$. However, the molar ratio of colloidal $SiO_2$ to soluble silicate should preferably be no more than about 3:1. A commercially available sodium silicate solution (water glass) with a $SiO_2$:$Na_2O$ ratio of around 3.4:1 and colloidal $SiO_2$ to soluble silicate ratio of around 2:1 appears to work well for most currently contemplated implementations of this invention. Gel formation optimally takes place when the alkali metal silicate solution concentration is between about 10 to 40% by weight. The rate of the polymerization reaction is most effected by the amount of gelling material used. FIG. 1 is an illustrative example of this relationship. It should be noted that the gel formation process using equal quantities of sodium or potassium fluorosilicate can take up to 20 times as long (10 to 20 minutes as opposed to 30 seconds to 1 minute) as with the alkali metal halide and nitrate salts.

The materials used to polymerize the alkali metal silicate solution are simple monovalent alkali metal salts, specifically one or more of sodium, potassium, or lithium fluoride, chloride, bromide, iodide, or nitrate. The word "simple" implies that the molecular structure is of the form $M_1$:$X_1$ where M represents the alkali metal ion and X represents the halide or nitrate ion. Experimentation has shown that potassium and sodium salts are generally preferred over lithium in terms of reactivity and the quality of the gel formed. Experimental data further indicates that potassium and sodium chloride and nitrate can be used to satisfy most applications currently contemplated for this invention. Therefore, toxic substances such as fluorides and bromides can usually be avoided in producing materials for home insulation products and similar applications.

The amount of alkali metal nitrate or halide required to polymerize the silicate solution can vary considerably depending upon solution concentration, additive materials, and the particular alkali metal halide or nitrate (gelling salt) used. In general, it appears that a minimum of about 1 part (by weight) of gelling salt to about 20 parts of low concentration (around 10%) silicate solution is required for gelling to occur within a reasonable time (on the order of several minutes or less). However, the optimum ratio appears to be about 1 to 4 parts gelling salt to about 10 parts silicate solution (prior to the incorporation of additives). Larger quantities of gelling salt may be used, but do not appear to be necessary. The gelling salt is usually added to the solution as a coarse or fine powder, but can be added as a strong solution or paste as long as its water content does not reduce the soluble silicate solution concentration to a level below which gelling cannot occur.

Figure 2:
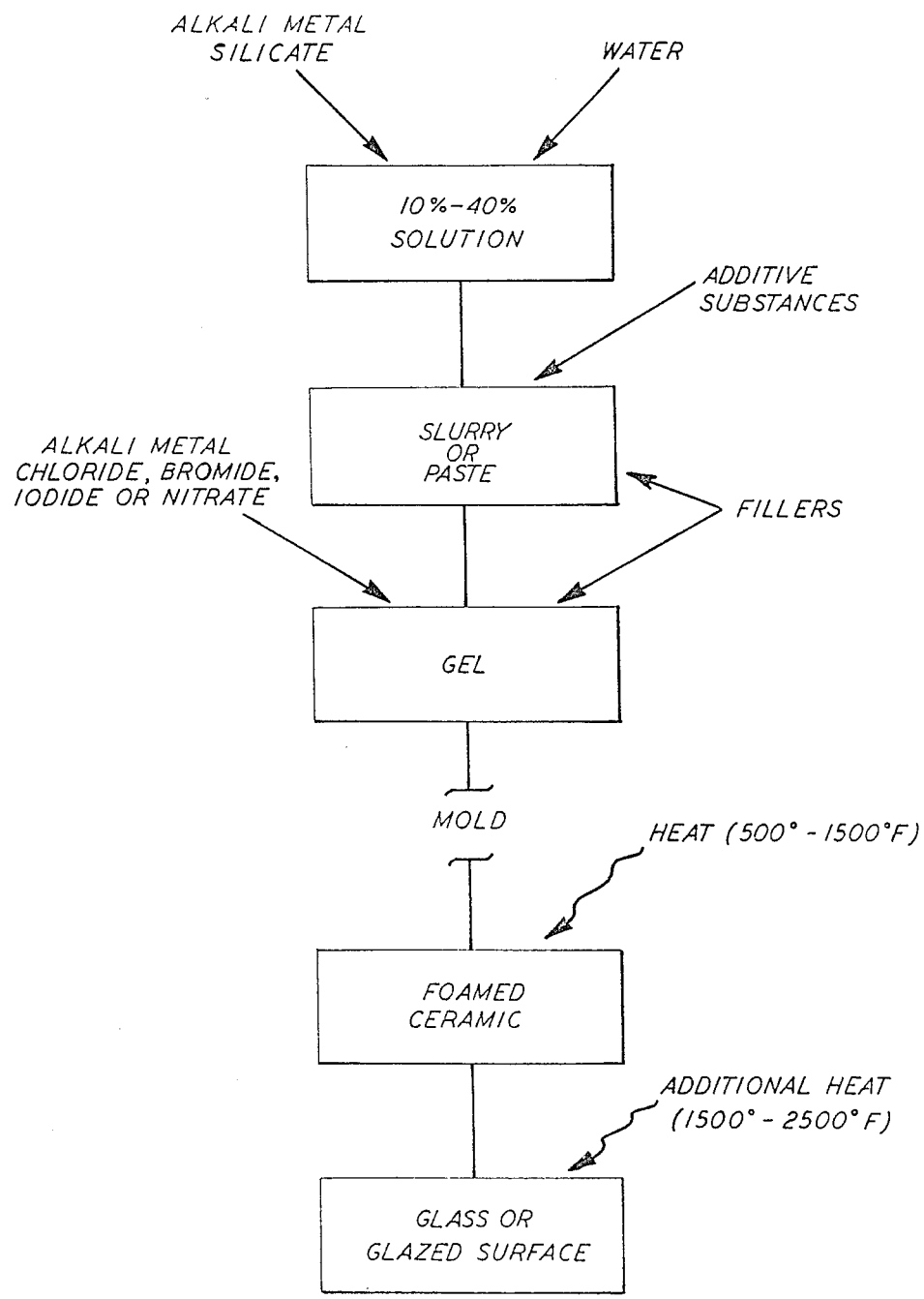
FIG. 2 is a diagrammatic illustration of the steps in the gel production process.

Additive substances may be incorporated into the gel to create a variety of desired properties in the final product. These substances are preferably added to the silicate solution prior to the addtion of the gelling salt. Although theey could be added in a single step with gelling salt, this may prevent a good dispersion of these substances throughout the gel. These additive substances are basically silicates, oxides, carbonates, and other ceramic substances obvious to anyone skilled in the art, chosen to create certain properties in the final product. The only restriction on these substances is that they do not react with the silicate in solution to any extent which would seriously inhibit or prevent the polymerization reaction caused by the addition of the gelling salt. Hence, these maerials are for the most part non-aqueous-soluble and non-reactive in the alkali metal silicate solution at room temperature. Specific examples of such materials are silica gel (silicic acid), silicates such as aluminum, calcium, and zinc silicate, oxides such as aluminum and magnesium oxide, and carbonates such as magnesium, calcium, zinc, and lithium carbonate. Examples of some aqueous-soluble materials which do not adversely react with the silicate solution, and which appear to enhance the uniformity and strength of some intumesced compositions are alkali metal sulfates and phosphates. FIG. 2 illustrates the preferred method for mixing the raw materials to form the gel.

The most noted general effect of using additive materials is the increase in hardness and density of the gel, and the increase in density and toughness of the intumesced gel (ceramic foam). Gels containing little or no additives may exhibit a great deal of expansion (up to several hundred percent) during heating to cause intumescence, while those with large quantities of additives may form dense materials exhibiting very little expansion. Ceramic foams with densities ranging from as little as a few hundredths of a gram per cubic centimeter to as high as a few grams per cubic centimeter can be produced by varying the types and amounts of these additive substances. Additive substances may also be included to create other effects such as coloring the final product. For example, copper and iron silicates may be added to produce blue and yellow ceramic foams or glazed surfaces (by heating the surface of the foam to induce self-glazing).

For most applications envisioned at the present time, and for ease of manufacturing the gel, it appears that the ratio of additive substances to silicate solution should be between about 0:1 to 1:1. It should be noted that the insoluble (colloidal) $SiO_2$ present in most commercial sodium silicate formulations is included in the above ratio. It is assumed that most implementations of this invention will utilize commercially available sodium or potassium silicate solutions which contain a molar ratio of colloidal silica to soluble silicate of around 2:1. The amounts of additive substances required to produce similar results using other sodium or potassium silicate solution formulations can therefore be easily calculated by considering the concentrations of insoluble $SiO_2$ they contain.

Figure 3:
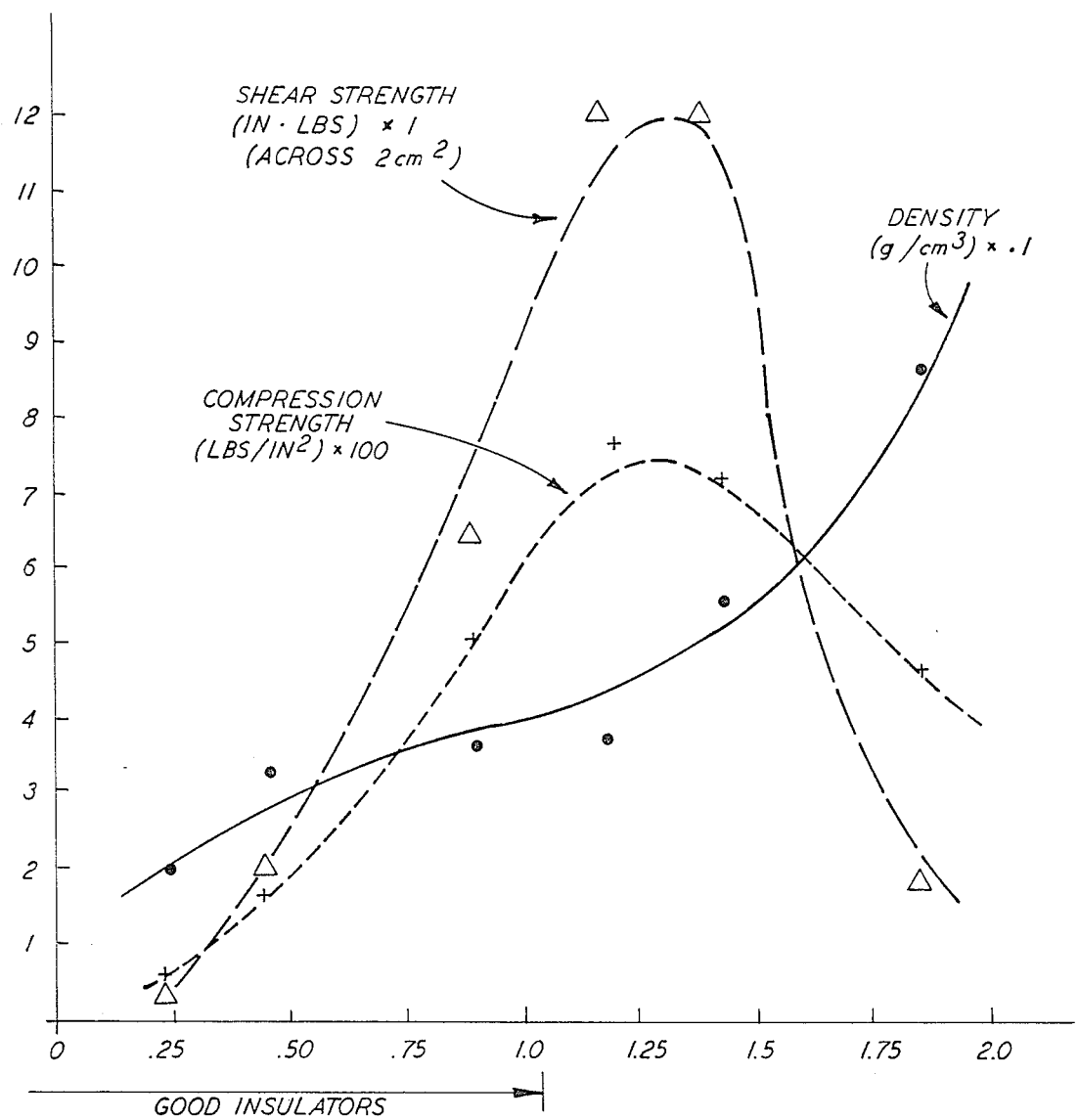
FIG. 3 is a graph illustrating a number of physical properties of a material formed by the process of the invention in relation to the molar ratio between additive substances and alkali metal silicate.
Figure 4:
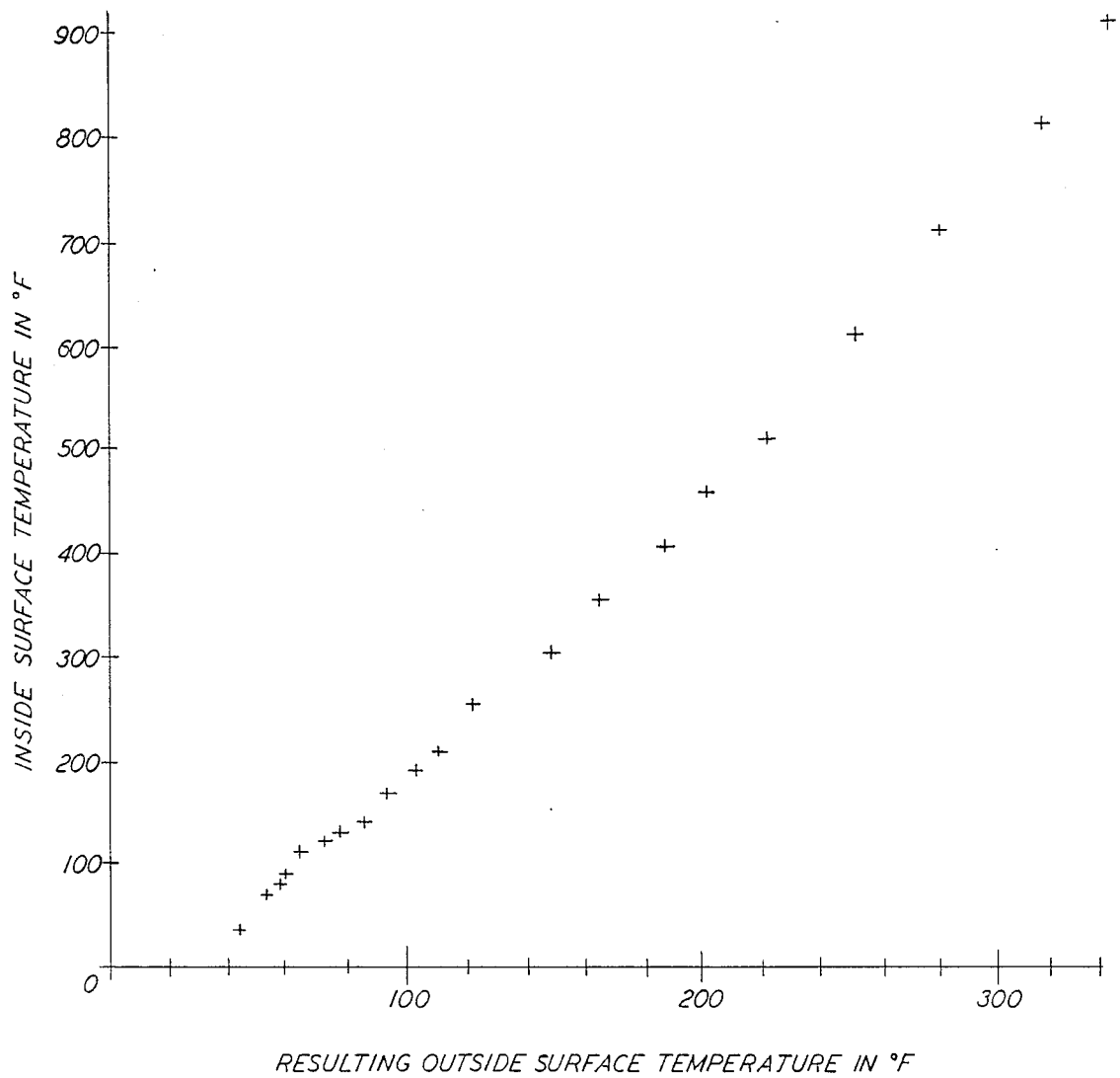
FIG. 4 is a graph illustrating some of the thermal insulating properties of a 1 cm thick sheet of ceramic foam wherein the molar ratio between the additive substances and the alkali metal silicate was approximately 0.4.

FIG. 3 illustrates some of the physical properties of a particular ceramic foam composition in terms of the ratio between additive substances and sodium silicate (including colloidal $SiO_2$) in the solution. FIG. 4 illustrates the results of an experiment to measure some of the insulative properties of these materials. In this experiment, a 1 centimeter thick sheet of ceramic foam containing approximately 2 parts additive substances to 10 parts commercial sodium silicate solution was used as one wall of an electric furnace. The furnace was quickly heated to 900° F. and allowed to cool to room temperature over a period of 8 hours. Other experiments indicate that even very low density foams remain rigid at temperatures up to around 1100° F. However, higher density ceramics made from gels containing additives such as magnesium oxide can remain rigid at temperatures exceeding 2000° F. Such materials may have a variety of industrial applications.

A further step in the process of this invention may include the addition of filler and reinforcing materials such as fibers, particulates (sand, crushed glass, etc.,), screen or mesh to the gel to enhance the strength of the final product. These could be added to the silicate solution, or mixed, pressed, layered, or folded into the gel during or after its formation. The total quantity of these substances that may be added is only limited by the saturation limits of the gel mixture.

The silicate gel materials described above can be formed into sheets, cast around pipes, etc,. or molded into any desired configuration. The gel can be used as is to form a reactive barrier against heat and fire, or heated to cause intumescence and the formation of a ceramic foam. To form the ceramic foam, the gel is heated using a thermal source, preferably between about 900° F. and 1300° F., or microwave energy may be used. Either thermal or microwave heating (or some combination of the two) may be more appropriate for different gel compositions. The duration of the heating process should be sufficient to cause partial or complete intumescence of the gel (as desired), and will vary for different gel compositions and thicknesses. Complete intumescence of an average gel sample of 1 centimeter thickness takes approximately 5 to 8 minutes at 1000° F.

The methods described above can be used to manufacture a number of useful materials. Among the possible applications for these materials are sheets of wall board, or similar construction materials which are light in weight, provide excellent thermal insulating qualities, are easily machined (sawed, drilled, ground, etc.), and which are non-toxic and fireproof. The material may also be used as bulk insulation or molded in various shapes to serve as an insulating layer or jacket on various items, including being cast in place directly around pipes, and the like. The properties of the material are controlled to suit the particular application by selection of the types and amounts of additive substances and fillers, process temperatures, and other variables. Finally, it should be noted that the material may be prepared in a plurality of layers, providing substrates having different properties, and diverse materials such as rods, wire mesh, etc. may be embedded or otherwise incorporated into the material for added strength or for other purposes. Likewise, the material of the invention may be deposited upon and/or bonded to layers of other materials, such as wood, paper, etc.

A number of specific examples illustrating the general principles and scope of this invention are provided below. It will be understood that the examples are in no way intended to be limiting.

EXAMPLE 1

A strong, low-density ceramic foam with good heat insulating properties is formed by mixing or blending 1 to 3 parts sodium or potassium chloride into 10 parts of commercial sodium silicate solution. The resulting gel hardens quickly and can be used as is or heated at about 1000° F. to intumescence.

EXAMPLE 2

Add 1 part potassium sulfate to 10 parts commercial sodium silicate solution. To this mixture, add 2 parts potassium nitrate (or sodium or potassium chloride) to cause polymerization. The gel may be heated at around 1000° F. to form a light-weight ceramic foam, similar to that of Example 1. Preferably, the gel is first heated in a microwave oven to cause partial intumescence and is the further heated at about 1000° F. to essentially complete intumescence. This results in a more homogeneous foam structure.

EXAMPLE 3

A very tough, high density ceramic is formed by first mixing 4.5 parts silica gel, 1.8 parts alumina silicate, and 1.5 parts calcium carbonate with 20 parts of commercial sodium silicate solution. 4 parts of potassium nitrate are then added to polymerize the mixture. The gel hardens quickly, and can be molded and pressed into sheets. It is then heated between 1000° and 1300° F. to form a tough, dense ceramic foam.

EXAMPLE 4

A high temperature ceramic is formed by first mixing 1 part silica gel and 5 parts magnesium oxide with 10 parts commercial sodium silicate solution. 1 part potassium nitrate is then mixed in to ploymerize the mixture. The gel is very dense, but can be molded and pressed into sheets. The gel can be heated at around 1000° F. to produce a ceramic which can resist temperatures above 2000° F.

EXAMPLE 5

A medium density tough ceramic foam which could be used for boards or ceiling tiles is formed by mixing 1 part silica gel and 0.2 parts calcium carbonate into 10 parts of commercial sodium silicate solution. 1 part sodium or potassium chloride is then mixed in to form a hard, polymerized gel. The gel is molded or pressed into sheets. It is then heated in a microwave oven to produce a ceramic foam.

EXAMPLE 6

Any of the above examples in which filler materials such as fibers and/or particulates (sand, crushed glass, etc.) have been incorporated into the gel.

What is claimed is:

1. A method of forming a silicate gel which exhibits intumescence upon application of heat said method comprising adding about 0.5 to 12 parts by weight of at least one alkali metal chloride, bromide, iodide or nitrate to 10 parts of an approximately 10 to 40% (by weight) aqueous solution of sodium or potassium silicate, wherein the soluble $SiO_2$ to alkali metal oxide ratio is between about 2:1 and 5:1 producing a gel by a polymerization reaction being characterized by the essential absence of precipitation of insoluble silicate from said solution.

2. The method according to claim 1 and including the further step of mixing into said solution at least one insoluble silicate, carbonate or oxide which does not react with the soluble silicate or otherwise inhibit the gelling process, wherein the weight ratio of said insoluble material, including any colloidal $SiO_2$ initially present in said solution, to said solution is between about 0.05 and 1.

3. The method according to claim 1 wherein said alkali metal chloride, bromide or iodide or nitrate is at least one of sodium chloride, sodium nitrate, potassium chloride and potassium nitrate.

4. The method according to claim 1 and including the further step of incorporating into said gel at least one inert particulate material, organic or inorganic fiber in a quantity between about 0.5 parts by weight and the maximum amount of said particulate material or fiber which can be dispersed in the gel.

5. The method of claims 1, 2 or 4 and including the further step of heating said gel at a temperature of at least about 1000° F. until intumescence thereof is substantially complete.

6. The method of claim 5 wherein said heating step is carried out by first heating said gel in a microwave oven to at least initiate intumescence of said gel, and then heating said gel with a thermal heat source at a temperature of at least 1000° F. until intumescence is essentially complete.

7. The method according to claims 1, 2 or 4 and including the further step of pressing said gel into essentially flat sheets.

8. The method according to claim 7 and including the further step of heating said sheets at a temperature of at least about 1000° F. until intumescence thereof is substantially complete.

9. The method according to claim 1 and including the further step of molding said gel to a desired shape and incorporating therein at least one diverse reinforcing member.

10. The method according to claim 1 and including the further steps of heating said gel at about 1000° F. for a time sufficient to at least initiate intumescence and thereafter heating at least one surface of said gel to its melting temperature, thereby providing a glazed surface.

* * * * *